United States Patent [19]

Higgens et al.

[11] 3,847,742

[45] Nov. 12, 1974

[54] PROCESS FOR DEACETOXYCEPHALOSPORIN C

[76] Inventors: Calvin E. Higgens, R.R. 1, Indianapolis, Ind. 46727; Robert L. Hamill, RR 1, New Ross, Ind.

[22] Filed: Apr. 9, 1973

[21] Appl. No.: 348,341

Related U.S. Application Data

[63] Continuation-in-part of Ser. Nos. 247,608, April 26, 1972, abandoned, and Ser. No. 247,667, April 26, 1972, abandoned, and Ser. No. 247,668, April 26, 1972, abandoned, and Ser. No. 247,669, April 26, 1972, abandoned.

[52] U.S. Cl. .................................. 195/36 R, 195/81
[51] Int. Cl. ............................................. C12d 9/04
[58] Field of Search ................ 195/36 R; 260/243 C

[56] References Cited
UNITED STATES PATENTS
3,396,083  8/1968  Callow ............................ 195/36 R

OTHER PUBLICATIONS

Snell, Biosynthesis of Antibiotics Vol. 1 Academic Press, New York page 34 (1966).

*Primary Examiner*—Alvin E. Tanenholtz
*Attorney, Agent, or Firm*—William B. Scanlon; Everet F. Smith

[57]  ABSTRACT

Deacetoxycephalosporin C is produced by culturing a penicillin N-producing microorganism belonging to the genera Cephalosporium, Emericellopsis, Scopulariopsis, Paecilomyces or Diheterospora in an aqueous nutrient culture medium under submerged aerobic fermentation conditions and is recovered and isolated by chromatography of the filtered fermentation broth.

11 Claims, No Drawings

PROCESS FOR DEACETOXYCEPHALOSPORIN C

CROSS-REFERENCE TO RELATED APPLICATIONS

This application is a continuation-in-part of copending applications Ser. Nos. 247,608; 247,667; 247,668 and 247,669 all filed on Apr. 26, 1972 and all now abandoned.

BACKGROUND OF THE INVENTION

This invention relates to a method for the production of deacetoxycephalosporin C. In particular, it relates to a method for the production of deacetoxycephalosporin C which comprises culturing a penicillin N-producing organism of the genera Cephalosporium, Emericellopsis, Scopulariopsis, Paecilomyces and Diheterospora in a nutrient culture medium under submerged aerobic fermentation conditions.

The cephalosporin compound, deacetoxycephalosporin C, represented by the following structural formula

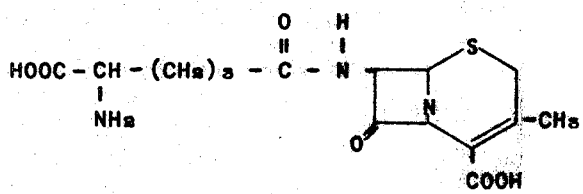

differs from cephalosporin C in that the acetoxymethyl group in the 3-position of the dihydrothiazine ring of cephalosporin C is replaced with a methyl group. This structural difference has been conveniently designated by the prefix desacetoxy or deacetoxy in naming the depicted cephalosporin compound. Alternatively, the more formal name, 3-methyl-7-(5'-amino-5'-carboxyvaleramido)-3-cephem-4-carboxylic acid, which follows the cepham nomenclature system has often been employed. For convenience, the compound produced according to the method of this invention is referred to herein as deacetoxycephalosporin C.

Deacetoxycephalosporin C is a valuable intermediate useful in the preparation of cephalosporin antibiotics. For example, it can be reacted with nitrosyl chloride under the conditions described by U.S. Pat. No. 3,188,311, to effect removal of the aminoadipoyl side chain and provide 7-aminodeacetoxycephalosporanic acid (7-ADCA). The 7-ADCA can then be acylated with the desired acyl group to provide the cephalosporin antibiotic. For example, 7-ADCA can be acylated by known methods with an active ester, mixed anhydride or other suitable derivative of phenylglycine to prepare the known antibiotic, cephalexin.

Deacetoxycephalosporin C has been previously prepared by the hydrogenolysis of cephalosporin C according to the method described by U.S. Pat. No. 3,124,576, issued Mar. 10, 1964. Because of the usefulness of this compound as an intermediate in the preparation of cephalosporin antibiotics there is a need for alternate, more economical approaches to the preparation of this compound.

SUMMARY OF THE INVENTION

Penicillin N (cephalosporin N) producing fungi of the genera Cephalosporium, Emericellopsis, Scopulariopsis, Paecilomyces, and Diheterospora, are cultured in an aqueous nutrient culture medium containing assimilable sources of carbon, nitrogen and inorganic salts under submerged aerobic fermentation conditions to provide deacetoxycephalopsporin C. Deacetoxycephalosporin C is separated from other co-produced substances such as cephalosporin C, penicillin N and desacetylcephalosporin C by first acidifying the whole broth with a mineral acid such as sulfuric acid to a pH of about pH 2. The acidified broth is stirred at room temperature for about 1 hour, during which time acid labile compounds are degraded. Thereafter, the pH is readjusted to pH 6.0 by the addition of a suitable base such as sodium hydroxide. The mycelium and other insolubles are filtered and the filtered broth is extracted with a water immiscible organic solvent to remove additinal impurities. The deacetoxycephalosporin C is recovered from the aqueous semi-purified broth by chromatography in the following manner. The aqueous broth is initially chromatographed over activated carbon. The carbon column is washed with water to further remove impurities, and thereafter the activity is eluted with 50 percent aqueous acetone. The eluate is concentrated and is passed over an anionic exchange resin, and the deacetoxycephalosporin C is eluted therefrom, preferably, with a 0.15 N sodium acetate solution. The eluates are then evaporated to dryness or lyophilized to provide a crude deacetoxycephalosporin C preparation. The crude material is purified by further chromatography over a cellulose column or over silica gel. The active fractions containing deacetoxycephalosporin C are either concentrated to a small volume or evaporated to dryness. The concentrate or dried solid residue is dissolved in a minimum amount of isopropanol and the solution is poured into diethyl ether to precipitate deacetoxycephalosporin C as the sodium salt.

DETAILED DESCRIPTION OF THE INVENTION

According to the process of this invention fungi of the genera Cephalosporium, Emericellopsis, Scopulariopsis, Paecilomyces and Diheterospora, which produce penicillin N, are cultured in nutrient media containing assimilable sources of carbon, nitrogen and inorganic salts to provide deacetoxycephalosporin C.

The microorganisms useful in the present process, with the exception of Emericellopsis, have been classified members of the class *Fungi imperfecti* in that they do not produce sexual spores. They are further classified in the order, Moniliales, the family Moniliaceae and the genera Cephalosporium, Scopulariopsis, Paecilomyces and Diheterospora. The microorganisms of the present method which produce ascospores have been classified in the genus, Emericellopsis, which is the perfect sexual stage of the Cephalosporium. These organisms, accordingly are classified as Ascomycetes of the order Eurotiales in the family Eurotiaceae.

The above classification of the fungi useful in the present invention is based on their observed morphological and cultural characteristics. In the paragraphs which follow the taxanomic description of a number of fungi, which are illustrative of the respective genera, is presented.

The references to "Maerz and Paul Color Plates" refer to the Color plates in Maerz and Paul, Dictionary of Color, McGraw-Hill Book Co., Inc., New York (1950

Cephalosporium — General Morphology

Spore-bearing cells are phialides which arise directly from vegetative hyphae or from funiculose strands of hyphae or from coremia. Phialides are hyaline, tapering, producing phialospores at the apex, which form either in balls or fragile chains. Spores are usually nonseptate, globose to short cylindric. Colonies vary from smooth and moist without aerial mycelium to granular and fluffy with aerial mycelium. The mycelium is usually composed of funiculose hyphae. Colony color ranges from white, to yellow to pink and dark gray or brown.

MORPHOLOGY AND CULTURAL CHARACTERISTICS

CEPHALOSPORIUM STRAINS

In the following taxanomic descriptions of Cephalosporium sp the cultures produced an imperfect stage characteristic of the genus Cephalosporium.

Cephalosporium sp. NRRL 5445

Sporogenous cells are produced on unbranched phialides which are alternately arranged and arise directly from synnematous hyphae. Phialides are essentially uniform in diameter with slight tapering at the apices. Phialides are one-celled, averaging 2.8 $\mu$ in diameter at the base and range from 14 $\mu$ to 25 $\mu$ in length, averaging 21 $\mu$. Phialospores occur commonly in chains but usually terminate into spore balls in older cultures. Phialospores are hyaline but appear light-ochraceous to medium-yellow-pink en masse (Maerz and Paul color plate 2–9A). Phialospores range from 1.4 $\mu$ to 4.2 $\mu$ × 2.8 $\mu$ to 4.9 $\mu$; averaging 2.4 $\mu$ × 3.5 $\mu$. Spores are polysymmetrical, and oval to obovate in overall shape.

Growth of the fungus differs on various media. On rich nutrient media such as V-8 juice agar and lactose-glycerol-peptone agar, cultures grow rapidly, attaining diameters greater than 50 mm. in 10 days. Aerial growth is floccose, white at first, becoming light ochraceous in older cultures. Aerial hyphae are principally composed of erect to semi-erect synnemata with some prostrate funiculose hyphae present. On synthetic media, growth is slow, aerial mycelium is sparse or lacking, with scant sporulation. Vegetative color is medium orange (Maerz and Paul plate 10–7F).

Cephalosporium chrysogenum ATCC 14615.

The taxonomic description of this fungi is provided by R. S. Sukapure and M. J. Thirmalachar, Studies on Cephalosporium Species from India I, Mycologia LV, 563–569 (1963).

Cephalosporium sp. NRRL 5712

On all of the following agars colonies show white aerial hyphae in 3 days and yellowish pink shades in 5 days.

Colonies grown on Czapek's solution agar show abundant floccose to funiculose hyphae with both erect and prostrate synnemata. They are radially folded, round, and with an entire, unbroken border and achieve 38 mm from a 16 mm in a zone. No fruiting appears on these colonies after 14 days. They are moderate yellowish pink; their reverse color is vivid orange.

Potato-dextrose agar colonies are a light grayish yellow. Colonies increase from an 18 mm diameter inoculated zone to 37 mm diameter. P.D.A. colonies show poor aerial hyphal development, appear velutinose, and are funiculose, and have erect and prostrate synnemata. Phialides are abundant and arise from synnemata, funiculi, and rambling hyphae, and elaborate conidia in chains and in moist balls. This medium is used to further evaluate the conidial stage.

Malt extract agar produces a 37 mm diameter colony from a 16 mm diameter inoculated zone. It is floccose to funiculose and produces the most synnemata, but the conidial stage is sparse. The colony is moderate yellowish pink and its reverse is pale orange.

Modified V-8 juice agar produces a colony which is 37 mm in diameter from an inoculated zone of 17 mm. Aerial hyphae are slightly longer than that of Czapek's colonies. The colony is moderate yellowish pink and its reverse color is brownish yellowish orange. It is floccose to funiculose with mostly prostrate synnemata. Phialides with conidia occur in moderate numbers.

Phialides are hyaline, acuminate and range in length from 55.8 $\mu$ to 92.1 $\mu$ and average 66.2 $\mu$. They taper from 2.3 $\mu$ at base apically to 0.5 $\mu$ wide.

Unicellular, hyaline, oblong to elliptical conidia range in length from 5.6 $\mu$ to 7.7 $\mu$ and in width from 2.5 $\mu$ to 3.5 $\mu$. They average 6.8 $\mu$ × 3.1 $\mu$.

Cephalosporium sp. NRRL 5716

Colonies on the agar media described below do not develop macroscopically visible, free, aerial mycelia but are observed as nearly smooth, flat, moist, pasty mycelium that is marked by gentle radial folds.

Czapek's solution agar produces a colony that may achieve 32 mm diameter from an inoculated area of 20 mm diameter. Phialides arise from tightly packed prostrate synnemata and randomly from the mycelial surface. This colony is pale yellowish white with a smooth, entire periphery. Reverse is white. A soluble pale yellowish green pigment is produced.

Potato-dextrose agar colonies resemble those on Czapek's in size, color, phialide production, consistency, and pigment. They differ in that potato-dextrose colonies are bordered by a narrow, radially folded, laciniate margin. After 14 days, the soluble pigment becomes more intense.

Malt extract agar colonies are also similar to those on Czapek's solution agar, but lack the soluble pigment production. Up to seven days this colony is white on both surfaces and by 14 days becomes pale greenish yellow on both surfaces.

Modified V-8 juice agar produces a colony which is different from the above colonies in several characteristics. It is light brown and has relatively deep, close radial folds. The reverse is pale brown and the mycelium penetrates well into the agar. Loose, white aerial tufts of hyphae dot the surface.

Microscopically this colony is composed of a mat of tightly woven irregular hyphae whose cells are swollen and distorted. Its growth rate resembles Czapek's solution agar colonies. Phialide production is greatest on this medium; they arise profusely from the colony surface and from hyphae comprising the tufts. These phialides are hyaline, one-celled, acuminate and are lateral outgrowth of hyphal filaments. They range from 20 $\mu$ to 46.5 $\mu$ long and from 2.3 $\mu$ to 4.7 $\mu$ wide at their bases, averaging 39.37 $\mu$ × 4.65 $\mu$. Apically they are 0.5 $\mu$ wide.

Conidia are connected in chains or moist balls. They are hydaline, one-celled, smooth and generally fusiform. Some few are allantoid but with nearly tapered ends; some are navicular. They are from 3.5 $\mu$ to 7.0 $\mu$ long and from 1.4 $\mu$ to 2.1 $\mu$ wide, averaging 5.0 $\mu$ × 1.5 $\mu$.

Cephalosporium sp. NRRL 5718

Colonial development of aerial mycelium on Czapek's solution agar is sparse and colorless. Hyphae are irregular with swollen, distorted cells.

Potato-dextrose agar produces a flat, zonate colony with alternating bands which differ in amount of aerial growth. Growth is funiculose and moderately synnematous with conidiaproducing phialides arising from funiculi, synnemata, and rambling hyphae. Moist conidia form into chains or balls. This colony is pale yellowish white on both surfaces. It grows from a 17 mm diameter inoculated area to a colony that is 40 mm in diameter in 10 days at 26° C.

The conidial stage, zonation, hyphal development, colony size on malt extract agar are as on potato-dextrose agar. There is a 4 mm, colorless margin. The malt extract colony is pale grayish white and its reverse is pale yellowish white.

Although the growth rate is comparable to the above media, colonies on Modified V-8 juice agar show the most abundant development of hyphae and conidia. This colony is floccose to funiculose, with both erect and prostrate synnemata. It is surrounded by a 3 mm wide, flat, nearly velutinose border that is slightly undulated. The mycelium is pale yellowish pink and slightly grayish white in the margin; the reverse is light grayish tan. The colony margin is sharply contrasted with the main portion of the colony.

Phialides are hyaline, one-celled, acuminate structures. They are from 18.9 $\mu$ to 29.4 $\mu$ long and 2.8 $\mu$ wide at their bases, averaging 24.6 $\mu$ × 2.8 $\mu$.

Conidia are hyaline, one-celled, and elliptical. They range from 3.5 $\mu$ to 4.2 $\mu$ in length and are 2.1 $\mu$ wide, averaging 4.1 $\mu$ × 2.1 $\mu$.

Cephalosporium sp. NRRL 5719

The imperfect stage of this mold is classified in the genus Cephalosporium Corda. No perfect stage is produced.

Colonies on Czapek's solution agar are sparse, colorless, and non-sporulating up to 10 days at 26° C. Presence of numerous spores on the agar surface indicates failure to germinate on this agar. Malt extract agar colonies tend to grow relatively flat, achieving 29 mm diameter from a 17 mm diameter inoculated area. The periphery is sharply defined and slightly scalloped. Occasional tufts of floccose to funiculose hyphae extend above the lower rambling hyphal surface. These colonies are very pale pinkish white with a white reverse. Some phialides with terminal chains and balls of conidia arise from the rambling funiculi and individual hyphal filaments. Potato-dextrose agar produces a flat, crenate colony that is oyster white on both surfaces and that grows to 26 mm diameter from the inoculated area of 18 mm diameter. Aerial mycelium consists of weakly floccose hyphae that is loosely interwoven with funiculose hyphal strands from which rise numerous phialides, a few of which are laterally branched. Conidia form apically on the phialides in moist balls, and rarely in chains. With age the spores collect in moisture along the hyphal filaments and funiculi. Modified V-8 juice agar give best aerial development. White aerial hyphae becomes beige with numerous spores. The surface is irregularly floccose containing both funiculi and synnemata and displays a slightly crenate margin. Phialides develop laterally on both funiculi and synnemata. Sporulation occurs as on potato-dextrose agar.

Phialides are one-celled, hyaline, and are from 17 $\mu$ to 26.4 $\mu$ long and are 3 $\mu$ wide at their bases. They average 11 $\mu$ × 3 $\mu$ tapering to 1.5 $\mu$.

Conidia are hyaline, thick-walled, slightly roughened, and globose to elliptical. They are from 4.2 $\mu$ to 5.25 $\mu$ long and from 2.1 $\mu$ to 3.5 $\mu$ wide, averaging 4.64 $\mu$ × 2.85 $\mu$.

Cephalosporium sp. NRRL 5720

Growth on Czapek's solution agar at 26° C. for 10 days is sparse and without the development of aerial mycelium. The colony is largely subsurface, spreads only 3–5 mm, and has an indeterminant margin.

After 10 days at 26° C. potato-dextrose agar produces a colony which expands from a 12 mm diameter inoculated zone to 37 mm. This colony is zonate with alternating bands with and without aerial mycelium. It is floccose to funiculose and synnematous. The colony is yellowish white and the reverse is pale yellow. Phialides arise from funiculi, synnemata, and rambling hyphae.

Malt extract agar colonies achieve a 31 mm diameter, growing from a 16 mm inoculated area. The colony is zonate and bordered with a narrow, unbroken margin of aerial hyphae. Zonation, conidial stage, and color are as described for colonies on potato-dextrose agar.

Modified V-8 juice agar produces colonies with the most aerial mycelium. This colony grows from a 13 mm diameter inoculated area to 37 mm diameter. Aerial mycelium is dense and interwoven, strongly funiculose, floccose approaching lanose. The colony is pale yellowish pink; its reverse shows alternating rings that are pale yellowish tan in the center, then a darker ring, etc.

Phialides are long, acuminate, tubular, hyaline structures which are bulbous at their bases. They are from 15.4 $\mu$ to 24.5 $\mu$ long, from 2.1 $\mu$ to 3.5 $\mu$ wide at their bases, averaging 19.9 × 2.5 $\mu$.

Conidia are generally smooth — some are verrucose—, hyaline, and globose to subglobose. They range in diameter from 2.8 $\mu$ to 4.9 $\mu$ and average 3.65 $\mu$.

Cephalosporium sp. NRRL 5721

On Czapek's agar growth is sparse, non-pigmented, and nonsporulating. Colonies on malt extract agar achieve 28 mm diameter from an inoculated zone of 15 mm diameter in 7 days at 26° C. Aerial mycelium is floccose to velutinose. Microscopically it is funiculose and with synnemata that are either erect or prostrate. The colony is zonate, showing a border and an inner margin of varying shades. It is moderate yellowish pink surrounded by a margin that is pale yellowish pink; the reverse is pale yellowish green.

Potato-dextrose colonies which increase from a 15 mm diameter zone of inoculum are surrounded by a crenulate, colorless veil-like margin that is 8 mm wide. The main surface of the colony is 30 mm in diameter and is composed of a floccose to funiculose white, short aerial felt. After 14 days the colony becomes pale tan, the reverse is moderate orange yellow with the periphery a paler shade.

Modified V-8 juice agar colonies grow from a 15 mm diameter inoculated zone to 38 mm in diameter including a 3–4 mm wide, veil-like, colorless, slightly crenate margin. The main body of the colony consists of funiculose hyphal filaments which interweave over the surface in a lace-like pattern. The colony is somewhat floccose and shows slight radial folds. It is pale brown with a yellowish brown reverse.

All agars show synnematous hyphae but this condition is best observed on potato-dextrose and modified V-8 juice agars. Smooth, unicellular, hyaline phialides arise from synnemata and rambling funiculi and are described on potatodextrose agar colonies.

These phialides range from 9.1 $\mu$ to 38.5 $\mu$ long and from 2.1 $\mu$ to 2.8 $\mu$ wide at their bases. They average 22.26 $\mu \times$ 2.5 $\mu$ tapering to 0.7 $\mu$. Conidia are unicellular, smooth, hyaline and globose to subglobose. They are from 2.8 $\mu$ to 4.9 $\mu$ long and from 2.8 $\mu$ to 4.2 $\mu$ wide, averaging 3.6 $\mu \times$ 3.1 $\mu$.

Cephalosporium sp. NRRL 5722

On Czapek's solution agar it achieves 32 mm diameter from an inoculated area of 14 mm. The mycelium is flat, colorless on both surfaces, radially ridged, and devoid of aerial mycelium. Malt extract agar colonies grow to 36 mm in diameter from an inoculated area of 20 mm in diameter. Aerial hyphae are funiculose and have both erect and prostrate synnemata. It is radially ridged and is surrounded by a flat, smooth, 2 mm wide margin. Phialides arise from both funiculi and synnemata with good conidial development. Malt extract colonies are pinkish tan and their reverse colors are med-yellowish white. Colonies grown on potatodextrose agar are funiculose, appear to be velutinose with short, erect hyphal filaments. Conidia are sparse. The culture produces a grayish white colony with a medium grayish brown 2 mm wide margin and the reverse is medium yellow. It achieves 30 mm in diameter from an inoculated area of 16 mm diameter. On Modified V-8 juice agar colonies have pale grayish white aerial hyphae which becomes beige to buff with sporulation. The reverse is light brown with a yellowish white 3 mm border. An inoculated area of 15 mm diameter grows to 34 mm diameter in 10 days at 26° C. This colony has a relatively deep floccose to funiculose aerial felt and is strongly synnematose.

The conidial stage was observed on all 3 media. Phialides are hyaline, one-celled, tapered and cuminate. They range from 1.4 $\mu$ to 3.5 $\mu$ wide at their bases tapering to 1.4 $\mu$ and from 10.5 $\mu$ to 25.9 $\mu$ in length, averaging 20.2 $\mu \times$ 3.75 $\mu$. Conidia are one-celled, hyaline, elliptical to oval to obovate, and form in either chains or mucoid balls. They range from 2.1 $\mu$ to 2.8 $\mu$ wide and from 3.5 $\mu$ to 4.9 $\mu$ long, averaging 4.0 $\mu \times$ 2.45 $\mu$.

Cephalosporium sp. NRRL 5723

This culture is characterized by its imperfect stage and is in the genus Cephalosporium Corda. No perfect stage is evident. Growth is restricted on all agars and is often observed as a series of irregular lobes which radiate from the inoculum site.

Czapek's solution agar produces a colony which is irregularly crenate to lobular and lobes are laciniate. Irregular lobation results in variations in diameter which are from 25 mm to 30 mm expanded from a 12 mm inoculated zone. Free aerial components are sparse and are observed microscopically. They consist of scattered phialides, synnemata, aerial hyphal strands. This colony is colorless on both surfaces.

Colonies on potato-dextrose agar are deeply and irregularly lobed producing only restricted white aerial hyphae and are surrounded by a smooth, 3 mm wide margin. They range from 30 mm to 35 mm in diameter. Both erect and prostrate synnemata give rise to phialides which elaborate spores in chains or moist balls. The vegetative mycelium is flat, light grayish brown with a pale yellowish brown reverse.

Malt extract colonies are strongly and irregularly lobular and have a narrow radially folded margin. They are medium brownish pink with a pale yellowish pink reverse. Phialide and conidial production resembles potato-dextrose colonies but are more numerous.

Modified V-8 juice agar produces a colony which varies in diameter up to 40 mm from a 15 mm inoculated area. An unevenly lobular, colorless, subsurface, 3 mm wide margin surrounds the colony. This colony is floccose to funiculose, with synnemata and aerial hyphae appearing as a flat surface with more dense and deeper growth near the margin. It is pale brownish pink and the reverse is light brownish yellow. Phialides arise from synnemata, funiculi, and rambling hyphae.

Phialides are observed and described from colonies grown on potato-dextrose and on Modified V-8 juice agars. They are hyaline, unicellular, with bulbous bases, and taper gently to a 1 $\mu$ wide apex. They range in size from 12.5 $\mu$ to 23.0 $\mu$ long and from 2.1 $\mu$ to 2.8 $\mu$ wide at their bases, averaging 19.0 $\mu \times$ 2.3 $\mu$.

Conidia are unicellular, hyaline, smooth, and elliptical to oval. They are from 2.8 $\mu$ to 5.6 $\mu$ long and from 2.1 $\mu$ to 3.5 $\mu$ wide, averaging 4.48 $\mu \times$ 2.8 $\mu$.

Cephalosporium sp. NRRL 5724

Aerial free hyphae are sparse on all media described below and occur as either floccose tufts or scattered single strands on a moist-appearing mycelium.

Inoculum applied to a 17 mm diameter area on Czapek's solution agar and incubated at 26° C. for 10 days grows to a colony diameter of 39 mm. Indented points of an unevenly crenate periphery appear joined to the center of the colony by radial lines of lesser development. Scattered phialides arise from the flat mycelial surface and support moist balls of conidia. The mycelium is pale yellowish white; the reverse is white.

Malt extract agar colonies grow from an 18 mm diameter inoculated area to 37 mm in diameter. This type of colony has a 4 mm wide margin that is veil-like and whose outer edge is indistinct. The main portion of the colony is flat and smooth and has a circular pattern of irregularly spaced tufts separating it from the margin. Scattered phialides supporting moist balls of conidia occur randomly over the pale pinkish tan surface. The colony reverse is pale yellowish white.

Potato-dextrose agar, when inoculated in a 14 mm diameter inoculated zone, produces a colony which is 35 mm in diameter. The margin is 4 mm wide, veil-like, and mostly submerged. This colony is flat and smooth with scattered floccose to funiculose tufts of hyphae. Phialides produce conidia in short chains or moist balls but are relatively few and well scattered over the surface. This colony is pale orange yellow on both surfaces but is slightly paler on the reverse. The colored portion is irregularly lobed.

Modified V-8 juice agar colonies grow from a 15 mm diameter inoculated area to 34 mm in diameter. A veil-like 3–7 mm wide margin surrounds a denser central area and is irregularly lobed. Free aerial components are scant. The nearly pasty, flat central portion is pale yellowish white on both surfaces. Mycelial cells are swollen and distorted. No soluble pigment is produced. The culture, on this agar resembles C. chrysogenum.

Phialospores are smooth, one-celled, hyaline, and elliptical. They are from 4.2 $\mu$ to 5.6 $\mu$ long and from 2.1 $\mu$ to 3.5 $\mu$ wide, averaging 5.27 $\mu$ × 3.58 $\mu$.

Phialides are hyaline, tubular, laterally produced on rambling hyphae. They are from 10.5 $\mu$ to 19.6 $\mu$ long and from 2.1 $\mu$ to 3.5 $\mu$ wide at their bases; averaging 15.89 $\mu$ × 2.4 $\mu$. They taper to 1.0 $\mu$ wide at their apices.

Cephalosporium sp. NRRL 5725

This culture grows sparsely on Czapek's solution agar, and produces a non-pigmented mycelium of indeterminant margin. The culture grows moderately well on potato-dextrose agar and on malt extract agar; abundant growth is produced on a modified V-8 juice agar. Colonies are described after 10 days at 26° C.

On malt extract agar an inoculated area of 15 mm diameter develops to a 30 mm diameter colony. It is a pale brownish-white color; the reverse is colorless. The central portion of the colony is distinctly synnematous in a network of funiculose to floccose hyphae. There is a slightly scalloped margin of short aerial hyphae interlaced with both erect and prostrate synnemata.

Modified V-8 juice agar produces a colony that is uniformly dense and marked by radiating ridges. The periphery is weakly scalloped. The colony is brownish-gray, being slightly darker on the ridges and periphery. The reverse is pale yellowish-brown. It is funiculose to floccose with both erect and prostrate synnemata. It produces a 32 mm diameter colony from a 15 mm diameter area of inoculation.

Potato-dextrose agar grows from a 15 mm diameter inoculated area to a 28 mm colony. The colony is thin, veil-like, and funiculose. The periphery is gently scalloped. There are weakly radiating folds which connect to the scallop indentations. It is colorless on both surfaces.

Divergent phialides arise from funiculi, synnemata, and rambling hyphae. These phialides are gently tapered, hyaline, smooth, and unbranched. They are 3 $\mu$ wide at their bases and 0.5 $\mu$ wide at their apices. They range from 9.5 $\mu$ to 35.0 $\mu$ in length and average 22 $\mu$ × 3 $\mu$.

Conidia are formed in moist balls or chains at the apex of the phialide. These conidia are hyaline, smooth, onecelled, and subglobose to elliptical. They are from 2.1 $\mu$ to 3.5 $\mu$ wide and from 2.1 $\mu$ to 4.2 $\mu$ long, averaging 3.43 $\mu$ × 2.63 $\mu$.

Emericellopsis — General Morphology

Cleistothecia are globose, globrous and measure from 25 to 120 microns in diameter with sub-hyaline peridium. Ascospores are one-celled, ellipsoid, dark-walled with 3 to 6 characteristically longitudinal wings. Ascocarps contain from a few (less than 5) to many eight-spored asci which have evanescent walls.

MORPHOLOGY AND CULTURAL CHARACTERISTICS OF EMERICELLOPSIS STRAINS

Emericellopsis sp. NRRL 5713

This fungus is a member of the family Eurotiaceae and has both a conidial and an ascogenous stage. A16005 is classified as Emercellopsis von Beyma.

Czapek's solution agar produces dense aerial growth but neither type of spores. The colony expands to 37 mm diameter from an inoculated zone of 18 mm diameter at 26° C. for 10 days. Aerial hyphae, at first white, evolve to moderate yellowish pink. The reverse is vivid orange. Synnemata and funiculose hyphae are produced.

Malt extract agar produces a synnematous, floccose to funiculose colony of 32 mm diameter from an 18 mm diameter zone of inoculation. It is pale orange yellow and the reverse is pale yellowish pink. No fruiting occurs in 14 days.

Potato-dextrose agar produces a colony which achieves 32 mm diameter from an inoculated zone of 18 mm diameter. The colony is zonate, with sparse, short white aerial mycelium on a pale orange yellow, dull mat whose reverse is pale yellowish pink. Some scattered perithecia are seen, but conidia are abundant.

Modified V-8 juice agar produces a colony that is up to 31 mm in diameter from an inoculated zone of 18 mm diameter. It is radially folded, funiculose to floccose, light yellowish pink with a medium orange reverse. Phialides arise from synnemata, funiculi, and rambling hyphae; however, the conidial stage is obscured by the ascogenous stage. Cleistothecia are black, globrous, and globose to subglobose with thick walls of pseudoparenchymatous cells. They are from 57.4 $\mu$ to 131.7 $\mu$ in diameter and average 86.57 $\mu$. Two or more asci are contained in the cleistothecium. Asci are hyaline, thin-walled, and fragile. They average 28 $\mu$ in diameter. They contain eight brown, oval ascospores which are longitudinally adorned by three to five weakly serrate wings that are 1.5 $\mu$ wide. These spores are from 6.3 $\mu$ to 8.4 $\mu$ long and 4.2 $\mu$ wide. They average 7.4 $\mu$ × 4.2 $\mu$.

Phialides are hyaline, smooth, and occasionally branched. They range from 35 $\mu$ to 70 $\mu$ long and average 49 $\mu$. They are 2.5 $\mu$ wide at their bases and taper gently to 0.5 $\mu$ at their apices. Conidia collect in moist balls at the apices of phialides. They are smooth, hyaline, and elliptical and are from 2.5 $\mu$ to 3.0 $\mu$ wide, from 3.5 $\mu$ to 8.4 $\mu$ long, averaging 8.0 $\mu$ × 2.8 $\mu$. Phialide branches may be up to 54 $\mu$ long and also produce conidia.

Emericellopsis sp. NRRL 5714

This fungus is a member of the family Eurotiaceae and produces both a conidial and an ascogenous stage and is characterized as a species of Emericellopsis von Beyma. Abundant cleistothecia occur on a modified V-8 juice agar that result in a colony whose center is virtually black. The remaining colony area is a dark reddish gray; the reverse is brownish orange. Colonies on this agar are zonate (best observed on the reverse surface), radially folded, crenate, and floccose to funiculose. Within 3 weeks a black soluble pigment is produced. This colony grows to 37 mm in diameter in 10 days at 26° C. from a 20 mm inoculated zone. A moderately dense conidial stage also occurs on this agar.

Potato-dextrose agar produces a colony which expands from a 20 mm diameter inoculated zone to 38 mm in diameter in 10 days at 26° C. Numerous immature cleistothecia are produced. Conidia are relatively heavy. The mycelium is funiculose and develops both erect and prostrate synnemata. This colony is pale yellowish pink and is surrounded by a 3 mm margin of colorless, aerial-free hyphae; its reverse is medium orange yellow.

Malt extract agar colonies may achieve 37 mm in diameter from a 20 mm diameter inoculated zone. Good conidial expression is observed, but the ascogenous stage does not develop. The colony is pale orange-yellow on both surfaces. It is funiculose and develops both erect and prostrate synnemata.

On Czapek's solution agar aerial components are poorly developed. The colony is relatively flat and glossy. It achieves 44 mm diameter from an inoculated zone of 20 mm diameter. This colony is pale yellowish green on both surfaces with a 4 mm colorless margin of subsurface hyphae. The hyphae are irregularly shaped, distorted, and vacuolated.

Cleistothecia on modified V-8 juice agar are dark brown to black, glabrous, globose to subglobose, and range from 28 $\mu$ to 85 $\mu$ in diameter. The average is 56.6 $\mu$ in diameter. They contain subglobose asci which are colorless and fragile. These asci are 18.6 $\mu$ in diameter and each contains 8 brown ascospores. From 3 to 5 wings are arranged longitudinally on the spores and are 2 $\mu$ wide. The ascospore ranges in size from 8.4 $\mu$ to 11.2 $\mu$ in length and from 4.9 $\mu$ to 7.0 $\mu$ in width, averaging 10.0 $\mu \times 5.6$ $\mu$.

A typical Cephalosporium conidial stage is observed on potato-dextrose agar. Phialides arise from funiculi, synnemata, and rambling hyphae. They are unicellular, hyaline and gently tapered from base to apex. Their bases are 2 $\mu$ wide; apices are 0.5 $\mu$ wide. They are from 20 $\mu$ to 60 $\mu$ long and average 40 $\mu \times 2$ $\mu$. Conidia which are elaborated apically from phialides and form moist balls, are hyaline, smooth, unicellular, and elliptical. They are from 2.1 $\mu$ to 4.2 $\mu$ wide and from 3.5 $\mu$ to 7.0 $\mu$ long, averaging 3 $\mu \times 5$ $\mu$.

Emericellopsis sp. NRRL 5717

This fungus produces both an ascogenous and a conidial stage. It is classified as a member of the family Eurotiacae. This fungus is classified as Emericellopsis von Beyma. Both of these fruiting stages are described on modified V-8 juice agar but also occur on potato-dextrose agar. No fruiting is seen on Czapek's solution agar or malt extract agar in 14 days at 26° C.

Czapek's solution agar produces a 35 mm diameter colony whose periphery is entire and virtually circular. This colony is expanded from an 18 mm diameter inoculated zone. The most dense aerial hyphae occurs on this medium and the colony appears velutinose. Microscopic examination reveals synnemata and rambling funiculose hyphae. It is moderate yellowish-pink and the reverse is yellowish orange to vivid orange.

Malt extract agar produces a colony which is virtually free of aerial components, flat, lusterless, and pale yellowish orange. The reverse is pale yellowish white. Its growth rate approximates the Czapek's colony.

Potato-dextrose agar colonies grow from a 16 mm diameter inoculated zone to 35 mm diameter. The colony surface is floccose to lanose. There are both erect and prostrate synnemata which give rise to phialides. This colony is pale yellowish-pink and its reverse is pale orange yellow.

Modified V-8 juice agar produces a colony which grows from an inoculated zone of 20 mm diameter to 3–9 mm diameter. Synnematous, floccose to funiculose mycelium supports a heavy conidial stage. Numerous hyaline cleistothecia are evolved in 6 days then turn black, glabrous, and globose to subglobose in 10 days. They contain numerous hyaline, fragile asci which, in turn, contain 8 ascospores. These ascospores are medium brown and oval and are longitudinally adorned with from 2 to 6 ragged wings which are 0.5 $\mu$ wide.

Cleistothecia occur in the aerial hyphae or may be partially or wholly submerged in the agar. They range in diameter from 16 $\mu$ to 116 $\mu$, averaging 50 $\mu$ and may contain as few as 2 asci. Asci are 29 $\mu$ in diameter. Ascospores have relatively thick walls. They range in length from 5.6 $\mu$ to 7.0 $\mu$ and from 2.8 $\mu$ to 4.9 $\mu$ in width, averaging 16 $\mu \times 3.8$ $\mu$.

Phialides are branched or unbranched, hyaline, smooth and becoming acuminate. Branch phialides may be 30 $\mu$ long. In general, phialides are from 30 $\mu$ to 70 $\mu$ long and 1.5 $\mu$ wide at base. They average 51.3 $\mu$ long. Conidia occur terminally on phialides and form moist balls. Conidia are hyaline, smooth, fusiform approaching elliptical, and are from 8.4 $\mu$ to 14.0 $\mu$ long. Their width ranges from 3.5 $\mu$ to 6.3 $\mu$. Conidia average 4.7 $\mu \times 11.5$ $\mu$.

Emericellopsis sp. NRRL 5446

Cleistothecia are abundantly formed on V-8 juice agar and moderately on potato-dextrose agar. Growth is sparse on Czapek's agar. Cleistothecia are dark brown to brownish-black, glabrous, globose to subglobose, ranging from 35 $\mu$ to 68 $\mu$, averaging 50 $\mu$ in diameter. The peridium is about 5 $\mu$ thick, pale brown and composed of tightly interwoven hyphae. Asci are subglobose, ranging from 14 $\mu$ to 21 $\mu$ in diameter. Asci are eight-spored and form one to many asci per ascocarp. Ascospores are ellipsoidal to oval, 5.6 $\mu$ – 7.0 $\mu \times 8.4$ $\mu$ – 10.5 $\mu$, averaging 6.2 $\mu$ – 10.1 $\mu$, dark brown, smooth, with prominent wings, usually four, projecting longitudinally, about 2 $\mu$, and equidistant, from the ascospore wall. Irregular indentations occur on the margins of wings. Ascospore surfaces are otherwise smooth.

A Cephalosporium conidial stage is also produced but is sparse on all media. On potato-dextrose agar, unbranched phialides, hyaline, averaging 38 $\mu \times 1.6$ $\mu$, tapering at the apices, arise from synnematous aerial or prostrate hyphae. Spores usually occur in short chains from five to six, terminating in a moist ball. Condia are hyaline, one-celled, subglobose to oval, 5.5 $\mu$ – 6.5 $\mu \times 10$ $\mu$ – 12 $\mu$, usually 5.8 $\mu \times 10.6$ $\mu$.

The culture grows moderately on V-8 juice agar and potato-dextrose agar. On V-8 juice agar colonies are floccose to funiculose, aerial mycelium is white to pale brown with substrate mycelium appearing blue-gray. The reverse color is brownish orange in young cultures.

Emericellopsis sp. NRRL 5447

This organism is a cleistothecial fungus belonging to the family Eurotiaceae. Cleistothecia are produced abundantly within 5 days on V-8 juice agar; sparingly on potatodextrose agar. Very poor growth occurs on Czapek's agar.

Ascocarps are globose, globrous, brown to brownish-black, 25 $\mu$ to 120 $\mu$ in diameter, usually about 70 $\mu$; the peridium is transparent, hyaline to light brown, 5–6 $\mu$ in thickness; ascocarps, located randomly in the substrate mycelium, contain from one to many asci. Asci are globose to subglobose, irregular in outline, evanescent, 14 $\mu$ to 18 $\mu$ in diameter, containing eight spores each. Ascospores are ellipsoidal to oval, dark brown, one-celled, with four, pale brown, longitudinal wings having moderate dentate margins and may project to 2.1 $\mu$.

A conidial stage is also formed abundantly on potato-dextrose, and sparingly on V-8 juice agar. Conidiophores are phialides arising from funiculose, prostrate, aerial hyphae. conidiophores are hyaline, unbranched, smooth, mainly 3 $\mu \times 28~\mu$, with basal septations. Conidia are one-celled, globose, subglobose to obovate, polysymmetrical, ranging 2.8 $\mu$ – 8.4 $\mu \times 3.5~\mu$ –11 $\mu$; averaging 7 $\mu \times 6.5~\mu$; conidia are formed in globular heads, coalescing with adjacent conidial heads.

Cultures grow moderately; reverse color is brownish-orange, surface growth is white to bluish-gray, floccose to funiculose.

The imperfect stage of this organism is a form of Cephalosporium.

MORPHOLOGY AND CULTURAL CHARACTERISTICS OF SCOPULARIOPSIS

Scopulariopsis sp. NRRL 5715

Characteristics of this culture correspond with Raper and Thom's description of Scopulariopsis Bainier (1).

Production of either smooth or rough wall conidia arising from both lateral and terminal phialides but not in verticils, as well as color patterns and colony descriptions indicate that this culture probably fits between Raper and Thom's group III which is represented by *Scopulariopsis brevicaulis* var. *glabra* Thom. and group IX which is represented by *S. diversispora*.

Growth of this fungus on Czapek's solution agar is sparse and colorless. No fruiting occurs.

On potato-dextrose agar a colony is produced which increases from a 22 mm diameter inoculated zone to 34 mm diameter in 10 days at 26° C. Sporulation is scant and confined to the inoculated zone which contains nutrient carryover in the inoculum. The mycelium is colorless on both surfaces and has a smooth, even margin.

Malt extract agar produces a colony that increases from a 15 mm diameter inoculated zone to 33 mm diameter. This colony is pale yellowish pink on both surfaces with a colorless 4 mm wide radially folded margin. Both erect and prostrate synnemata and funiculose hyphae produce phialides which elaborate conidia generally in chains but occasionally in moist balls.

Modified V-8 juice agar gives the best colonial development of aerial components. This colony achieves 33 mm from an inoculated zone that is 15 mm diameter. A comparably flat, 3 mm wide marginal area is not as well grown, and is velutinous, marked by radiating fingers of sporulation. The larger central portion of this colony is pale tan, the result of relatively heavy sporulation. This area is strongly synnematous. Reverse color is medium brown, but after 10 days this color darkens to a light chocolate brown.

The potato-dextrose agar was used to describe the conidial stage of this culture. Phialides arise from synnemata and funiculi; some are terminal extensions of the conidiophore. They are uniformly shaped, enlarged at their bases and becoming acuminate. They are 2.1 $\mu$ wide at their bases and are 0.5 $\mu$ wide at their apices. Phialides are from 17 $\mu$ to 34 $\mu$ long and average 19.4 $\mu \times 2.1~\mu$.

Conidia are either rough-walled or smooth, hyaline, non-septate, globose to subglobose and typically have truncate bases which are characteristic of the genus Scopulariopsis. Smooth spores are often elliptical to oval, generally smaller and are probably immature. Both spore types were observed on modified V-8 juice agar colonies. Smooth conidia are from 3.5 $\mu$ to 4.9 $\mu$ long and from 1.4 $\mu$ to 2.1 $\mu$ wide, averaging 4.1 $\mu \times$ 1.9 $\mu$. Rough spores are from 3.5 $\mu$ to 5.6 $\mu$ long and from 2.8 $\mu$ to 4.2 $\mu$ wide, averaging 4.3 $\mu \times 3.6~\mu$. These rough conidial surfaces vary from verrucose to echinulate and resemble Penicillium spores. No perfect stage occurs up to 14 days.

Reference:
Raper, K. B. and Thom, C. 1949. A manual of the Penicillia. The Williams and Wilkins Company, Baltimore. 697–701.

MORPHOLOGY AND CULTURAL CHARACTERISTICS OF PAECILOMYCES

Paecilomyces carneus NRRL 5711

A13215 is classified as a strain of Paecilomyces carneus (Duche' et Heim) in the order Moniliales.

Colonies, in general, are velutinous to floccose, varying in depth of aerial felt according to substrate. Growth on Czapek's solution agar is relatively thin and somewhat funiculose. Colonies are usually white, becoming slightly colored with conidial development. Peripheries are sometimes slightly crenate and on Czapek's are highlighted by a band of deeply submerged mycelium. Reverse colors are bright greenish shades, to shades of yellow and on some media shades of brown.

Branching conidiophores which are from 100 to 300$\mu$ long arise from the agar or from rambling aerial hyphae. Divaricate branches may attain lengths of 40$\mu$. Frequently, secondary branches, or sub-branches occur which are from 10 to 15$\mu$. Sterigmata evolve in numerous patterns on the conidiophore and its branches. They may occur apically as a single sterigma or in verticils up to 5. They may be in whorls along the main axis with internodes of 5 to 20$\mu$. Generally sterigmata in verticils are widely divergent. Metulae are infrequent but are sometimes seen in verticils and with only a single sterigma attached. Individual sterigmata which are strongly divergent and often longer occur along the conidiophore and its branches.

The shape of the sterigmata typifies this genus. They are always lanceolate, being virtually cylindrical from their bases over approximately 75 percent of their length where they taper sharply to form a long thin tube of about 5.0$\mu \times 0.5\mu$.

Conidia are unicellular, subglobose to eliptical, dry and are finely roughened, being echniulate to aculeate. They form in long chains and the spores appear to be held together by a connective bridge, part of which may be seen on free conidia as small tabs of less than 1.$\mu$ long and 1.$\mu$ wide. These surface characteristics are best observed with an oil immersion objective aided by phase contrast lighting. In addition to these conidia, thick-walled terminal macrospores (4.9$\mu \times 3.5\mu$) are seen on some hyphae which are 100$\mu \times 3\mu$ long and arise freely from the mycelial mat.

Colonies on Czapek's solution agar at 26° C. may attain 332 mm diameter in 10 days with little or restricted outward growth thereafter. They are relatively flat with a velutinous to floccose surface and are moderately funiculose. The surface and subsurface growth is leathery; subsurface growth fans out to sharply border the colony. After 5 days colonies are white becoming yellowish white (ISCC-NBS, 92), polar bear (Maerz and Paul, 9-B-2) by 10 days. As conidia increase in number a very pale pink shade is seen. Reverse color is dark yellowish green (ISCC-NBS, 137), civette green (Maerz and Paul, 22-F-8). After 3 weeks the reverse is light yellow green (ISCC-NBS, 119) reed green (Maerz and Paul, 19-D-1). Conidial structures vary from single sterigmata, which may be either apical or strongly divergent from the main axis of the conidiophore or its branches, to verticils of from 2–5 sterigmata arranged on the apex. Occasionally, one or two whorls of sterigmata are seed surrounding the conidiophore beneath the apical verticil with internodes of 5–20μ. Sterigmata are smooth-walled and lanceolate. They range from 10.5 to 16.5μ long and average 14.35μ × 2.1μ, width being measured across the wider surface. Individual divergent sterigmata may achieve 20μ. Conidiophores produce divericate branches and these branches may produce sub-branches. Conidiophores are smooth-walled and are 2–4μ wide. Long chains of hyaline, echinulate to aculeate conidia, which are joined by a connective bridge, arise from the sterigmata. En masse, these conidia are pale pink. They are subglobose to eliptical and measure from 2.1 to 3.5μ long and from 1.75 to 2.8μ wide averaging 2.3 × 3.3μ.

On malt extract agar the colony grows up to 30 mm in 10 days with little further change. The center may be wrinkled and the colony extends outward in radial folds. A nearly white, 3 mm, velutinose border — pale yellow green (ISCC-NBS, 121), seafoam green (Maerz and Paul, 18-A-1) — surrounds a floccose to velutinose center which is light greenish gray (ISCC-NBS, 154), lichen green (Maerz and Paul, 26-A-2). The reverse is zonate, being a greenish yellow in the center surrounded by a concentric ring pattern which is light yellowish green (ISCC-NBS, 135), tiber green (Maerz and Paul, 18-E-6). Conidia, sterigmata and conidiophores shapes and patterns are as previously described. Conidia range from 2.1 – 3.5μ wide and 2.8 – 4.9μ long, averaging 3.3 × 4.5μ. Sterigmata range from 12.6 to 15.0μ long and 2.8 to 4.9μ wide, averaging 13.2 × 3.6μ. Conidiophore and branches are as on Czapek's. In addition single macrospores which may be referred to as aleurospores are developed on the apex of hyphal filaments which appear to arise from the agar and the rambling aerial hyphal mat.

Potato-dextrose agar has a similar growth rate. The colony is slightly crenate. The center is a somewhat floccose nearly velutinous felt that is also somewhat funiculose and is surrounded by a sectored periphery which consists of short aerial hyphae. The center is yellowish gray (ISCC-NBS, 93), woodash (Maerz and Paul, 27-A-1); the periphery is medium gray (ISCC-NBS, 265), platinum (Maerz and Paul, 45-A-3). Reverse color is grayish olive green (ISCC-NBS, 127), bronze green (Maerz and Paul, 16-J-7).

The relationship of A13215 to P. carneus, Duche' et Heim is unmistakable as described by A. H. S. Brown and G. Smith in "The Genus Paecilomyces Banier . . ." Trans. Brit. Mycol. Soc. 40(1), 17–89 (1957). A13215 sterigmata appear to be possibly longer. The aleurospores seen on potato-dextrose agar have been observed in other Paecilomyces species as discussed by Raper and Thom in the Manual of the Penicilli.

Additional penicillin N producing cultures which can be employed in the present process, owing to their taxonomic similarities with *Paecilomyces carneus* NRRL 5711, have been classified as members of the genus Paecilomyces. Two such cultures are identified as *Paecilomyces carneus* A.T.C.C. 16329 and *P. carneus* NRRL 2622.

MORPHOLOGICAL CHARACTERISTICS OF DIHETEROSPORA CHLAMYDOSPORIA

Phialides occur singly, or as whorls or single or branched conidiophores. Phialides are slightly swollen at the base and tapering to a slender apex. Phialospores are ovoid to short cylindric, smooth, hyaline, usually 1.5 to 2 microns × 2 to 5 microns. Aleurispores which are characteristic of the species, are large (15 to 30 × 10 to 20 microns), muriform, thick-walled, slightly pigmented brown, and multicellular and borne on short pedicels.

Colonies are white to off white, rapidly growing, densely floccose with an even, abrupt margin. No soluble pigment is produced.

As previously mentioned the fungi useful in the process of this invention are all further characterized as producers of penicillin N. In addition the above described fungi have the common morphological characteristic of forming phialospores from phialides which arise either singly from hyphae or from branched or unbranched conidiophores. The Emericellopsis organisms of the invention being the perfect sexual state of Cephalosporium do not demonstrate this morphological characteristic. They do exhibit a conidial stage (cephalosporium) which has this characteristic.

The majority of the above described strains of Cephalosporium, Emericellopsis, Scopulariopisis, Paecilomyces and Diheterospora have been deposited without restriction as to availability with the permanent culture collection of the Northern Regional Research Laboratory, Agricultural Research Service, United States Department of Agriculture, Peoria, Illinois 61604, where the cultures have been assigned the accession numbers which appear in the foregoing taxanomic description following the respective culture names.

The remaining cultures bearing the latter designation A.T.C.C., namely Cephalosporium chrysogenum A.T.C.C. 14615 and Paecilomyces carneus A.T.C.C. 16329 have been deposited without restriction as to availability in the permanent culture collection of the American Type Culture Collection, 12301 Parklawn Drive, Rockville, Maryland 20852.

As previously mentioned, an organism employed in the present invention is cultured by the submerged aerobic fermentation method. The culture medium employed can be any one of a number of different media. For example, various carbon sources can be employed, such as sucrose, glucose, starch, and like carbon sources. Likewise nitrogen sources can be selected from a wide variety of substances such as soybean meal, soybean grits, cotton seed oil, peanut meal, amino acids, amino acid mixtures, peptones and the like. However, for economy of production, maximum yield and ease of isolation certain media are preferred, for example, molasses can be a preferred source of carbohydrate and preferred sources of nitrogen are soybean meal, and amino acids.

Nutrient inorganic salts which are incorporated in the culture medium can include the usual salts capable of supplying sodium, potassium, ammonium, calcium, phosphate, sulfate, chloride, bromide, nitrate, carbonate, ferric, ferrous, magnesium, manganese, and like ions. The fungi of the present invention, like other antibiotic producing microorganisms, require certain essential trace elements for their growth, development and metalbolism. Such trace elements can be added to the fermentation medium; however, they are commonly supplied in sufficient quantities as impurities of the other ingredients added to the culture medium.

The Cephalosporium, Emericellopsis, Scopulariopsis, Paecilomyces and Diheterospora organisms of the present method can be cultured in small size equipment such as 1 liter shake flasks to provide small amounts of deacetoxycephalosporin C. For large scale production of the cephalosporin compound, the organism is cultured in large scale fermentation tanks under submerged aerobic fermentation conditions.

In carrying out the large scale preparation of deacetoxycephalosporin C, spores of the organism are maintained on an agar slant. The spores from the slant are employed to inoculate a vegetative medium having a small volume. The vegetative medium is incubated to produce a heavy fresh actively growing culture of the microorganism. This vegetative growth is then employed as the inoculum for the large scale fermentation medium. In certain instances it may be desirable to include yet a further vegetative medium as the inoculum for the fermentation medium. Such second stage vegetative media, or bump media, are commonly employed when the volume of the fermentation medium is significantly or grossly larger in volume than the first vegetative medium. In this manner, the spores of the organism are cultured at first on small volume vegetative medium to obtain inoculum for a vegetative medium of larger volume. The larger volume vegetative medium then supplies sufficient concentration of the organism to initiate a rapid onset of the fermentation in the large scale fermentation tank. The vegetative medium can have the same composition as the fermentation medium or it can contain additional ingredients to spur the growth and development of the organism on a small scale.

The microorganisms of the present method are observed to grow and produce deacetoxycephalosporin C over a pH range of from about pH 6.2 to about pH 8.0. During the submerged aerobic fermentation in large scale tanks, the pH of the medium increases from an initial pH of about 6.5 to a terminal pH of about 7.5.

The organisms of this invention can be grown at temperatures between about 20° and 35° C. Production of optimal yields of deacetoxycephalosporin C appears to occur at a temperature of about 26° C.

Maximum production of deacetoxycephalosporin C occurs when the organism is cultured in large scale tanks for a period between about 4 and 7 days. However, when cultured in small scale apparatus, such as 1 liter shake flasks, the growth of the organism is more rapid and it produces deacetoxycephalosporin C in shorter time, for example 2 to 3 days.

Since it appears that if the terminal pH in the large scale fermentation medium reaches pH 8.0 or above, the yields of deacetoxycephalosporin C may be adversely affected, it is desirable to monitor the pH of the large scale fermentation medium from time to time throughout the fermentation. If it appears that the pH will reach such levels prior to the time when maximum production of the antibiotic occurs, the pH can be conveniently adjusted downward by adding a suitable acid or buffering agent to the fermentation medium.

The production of deacetoxycephalosporin C during the fermentation can be followed by testing samples of the fermentation broth chromatographically. Alternatively, the presence of deacetoxycephalosporin C can be monitored by bioautographs. The organism, *Pseudomonas solanacearcum* can be employed as the detecting organism in the bioautographs.

As with most submerged aerobic fermentations, sterile air is passed through the culture medium to obtain more efficient growth of the organism and increased production of fermentation products. The volume of air forced through the culture medium is usually at least approximately 0.2 volumes of air per minute per volume of culture medium. However, an increased rate of air passage can often times have a beneficial effect on the production of deacetoxycephalosporin C.

The majority of the fungi useful in the process, in addition to producing deacetoxycephalosporin C and the characteristic penicillin N, also produce desacetylcephaloporin C, cephalosporin C and occasionally the lactone formed with desacetylcephalosporin C as well as other unidentified metabolites. Since some of the forgoing substances are acid labile, it is desirable in the recovery of deacetoxycephalosporin C from the fermentation medium, to treat the whole fermentation broth at an acid pH for a short time in order to destroy some of the co-produced impurities. In small scale fermentations, penicillin N can be destroyed by the addition of a penicillinase to the broth.

The deacetoxycephalosporin C fermentation product is recovered from the filtered fermentation broth thus treated and is separated from the other components of the fermentation medium by chromatography over an ion exchange resin and is further purified by chromatography over cellulose or silica gel followed by precipitation and recrystallization.

Initially, the filtered fermentation broth is subjected to a preliminary purification procedure which can include an initial extraction with a water immiscible organic solvent, such as n-butanol, amyl acetate, to remove impurities. The extracted broth can then be further purified in a preliminary manner by chromatography over activated carbon. The extracted broth is chromatographed over a column packed with activated carbon, for example, Pittsburgh 12 × 40 carbon, and the column washed with water to remove water soluble colored impurities and water soluble inorganics. The fermentation products are then eluted from the carbon with 50 percent acetone-water. The eluate is concentrated to the aqueous phase which is then chromatographed over a basic anionic exchange resin. Among the basic anionic exchange resins which can be employed are those of the polystyrene quaternary ammonium type, for example, those commercially available under the designation Dowex 1, Dowex 2 (Dow Chemical Co., Midland, Mich.) and those designated as IRA-400, IRA-45, IRA-68 (Amberlite, Rohm and Haas, Philadelphia, Pa.). The resin can be in the hydroxyl cycle, the acetate cycle, the formate cycle or other suitable cycle. The concentrated eluate from the carbon column is poured on to the anionic exchange resin and the resin is then washed with water. The deacetoxycephalosporin C is eluted from the exchange resin in the salt form with a suitable weak base, for example when the column is employed in the acetate cycle, the eluting solvent is desirably an aqueous solution of sodium acetate at a concentration of about 1 N or less. The concentration of the sodium acetate solution is not critical; however, in order to avoid the presence of excess inorganic salt, (sodim acetate) in the eluate from the exchange column, the desirable concentration of sodium acetate is between about 0.1 N and 0.5 N. An especially preferred concentration for elution which avoids excess salt in the eluate is 0.15 N. When the exchange resin employed is in the formate cycle or other suitable cycle, the corresponding salt can be employed in aqueous solution as the eluting solvent. For example, ammonium formate can be employed when the resin is in the formate cycle. Multiple fractions are collected and those fractions containing deacetoxycephalosporin C as determined by bioautograph are combined. The combined eluates are then chromatographed over activated carbon to remove excess inorganic salts, for example, sodium acetate which was employed as the eluting salt solution. The carbon column is washed with water to remove these inorganic water soluble salts and the deacetoxycephalosporin C is then eluted from the column with a 50 percent acetone water mixture. The eluate is evaporated to dryness or, alternatively, is evaporated to remove acetone and the concentrated aqueous solution is then lyophilized, to provide by either procedure, deacetoxycephalosporin C as a crude solid product.

The crude preparation of deacetoxycephalosporin C is further purified by chromatography over cellulose or silica gel or other suitable non-ionic adsorbent. The deacetoxycephalosporin C is eluted from the column with acetonitrile: water, 80:20 and multiple fractions are collected. The fractions found to contain deacetoxycephalosporin C, as determined by paper chromatography or bioautographs using the assay organism *Pseudomonas solanacearcum*, are combined and concentrated to a small volume or to dryness. The highly concentrated aqueous residue or the dry residue is then dissolved in a minimum amount of iso-propyl alcohol and the alcoholic solution is poured into a large volume of diethyl ether. The purified deacetoxycephalosporin C is obtained in the form of the salt corresponding to the aqueous eluting agent employed in the elution of the anionic exchange resin. For example, when sodium acetate is employed as the eluting agent, deacetoxycephalosporin C is obtained as the monosodium salt. The salt form of the deacetoxycephalosporin C is filtered and dried.

The preferred recovery conditons of the present method are as follows. The whole fermentation broth is acidified to pH 2 by the addition of sulfuric acid and the broth is stirred for one hour at room temperature. The pH of the broth is then adjusted to pH 6.0 with sodium hydroxide and the basified broth is thereafter filtered with the aid of a filter aid to remove mycelium and other insolubles. The aqueous broth is then extracted with n-butanol to remove additional impurities and the extracted broth is then chromatographed over activated carbon. The carbon column is washed with water and the fermentation product eluted therefrom with 50 percent acetone-water. The eluate is concentrated to an aqueous phase, and the aqueous phase is chromatographed over an anionic quaternary ammonium exchange resin in the acetate cycle, preferably, the quaternary ammonium polystyrene resin commercially available and designated as Amberlite IRA-68 (Rohm and Haas, Philadelphia, Pa.). The exchange resin is at first washed with water and the deacetoxycephalosporin C and other co-produced substances are eluted with 0.15 N aqueous sodium acetate. The active eluates are absorbed onto an activated carbon, and the column is washed with water to remove water soluble salts such as excess sodium acetate carried over from the resin eluates. The deacetoxycephalosporin C is eluted from the carbon with 50 percent acetone-water. The eluate is then evaporated to dryness to afford crude deacetoxycephalosporin C as the sodium salt. The crude material is purified preferably by chromatography over a cellulose column (Avicel PH 101). The cellulose column is eluted with acetonitrile:water (80:20), and multiple fractions are collected. Those fractions containing deacetoxycephalosporin C, as determined by bioautographs, are pooled and then evaporated to dryness in vacuo. The dried solid residue of deacetoxycephalosporin C is dissolved in the minimum amount of isopropyl alcohol. The alcohol solution is then poured into diethyl ether to precipitate the monosodium salt of deacetoxycephalosporin C.

In an alternative method for the isolation of deacetoxycephalosporin C, the eluate from the anionic exchange resin in the acetate cycle is concentrated by evaporation and a 20 percent aqueous solution of sodium acetate is added to the concentrate. The concentrate is stirred with chilling to precipitate the monosodium salt of deacetoxycephalosporin C.

The salt form of deacetoxycephalosporin C can be converted to the free acid by methods commonly employed for converting such salts to acids. For example, the salt can be passed over a cationic exchange resin to provide the free acid form.

The chromatographic system which is employed to identify deacetoxycephalosporin C in crude fermentation broths or in resin eluate fractions is carried out on Whatman No. 1 chromatography paper in the descending manner. The solvent system used for developing is acetonitrile:water, 80:20 V:V while the chamber is saturated with the vapors of the solvent mixture consisting of n-propanol:pyridine:acetic acid:acetonitrile:water in the proportions of 45:30:9:40:36 volume per volume.

The developed chromatograms are then run as bioautographs using *Pseudomonas solanacearcum* as the detecting microorganism.

In order to simplify the chromatography it is desirable to treat the assay sample with a penicillinase prior to running the chromatogram.

The following examples further illustrate the present invention.

EXAMPLE 1

Spores of Cephalosporium sp. strain NRRL 5445 were inoculated on a nutrient agar slant having the following composition:

| Ingredient | Percent (weight/volume) |
|---|---|
| Lactose | 1 |
| Glycerol | 1 |
| Soy Peptone[1] | 0.25 |
| Corn and Malt dried 2 2 | 0.25 |
| Magnesium sulfate heptahydrate | 0.05 |
| Ferrous sulfate heptahydrate | 0.001 |
| Calcium carbonate | 0.2 |
| Trace mineral solution[3] | 0.625 |
| Agar | 2 |
| Water to volume | |

[1]Enzymatic digest of soybean meal
[2]"Produlac", National Distiller Products Co.
[3]Contains the following salts per 100 ml. of deionized water:
    Weight        Salt
    0.102 g       $CuSO_4 \cdot 5H_2O$ -Continued

| Ingredient | Percent (weight/volume) |
|---|---|
| 0.018 g. | $FeSO_4\cdot 7H_2O$ |
| 0.126 g. | $MnCl_2\cdot 4H_2O$ |
| 0.024 g. | $ZnSO_4\cdot 7H_2O$ |

The slant was incubated for about 7 days at a temperature of 26° C. The mature slant culture was covered with sterile distilled water and scraped gently with a sterile rod to obtain a spore suspension.

The spore suspension thus obtained was used to inoculate a sterile vegetative growth medium having the following compositin:

| Ingredient | Percent (weight/volume) |
|---|---|
| Peanut meal | 2 |
| Malt extract | 2 |
| Corn steep liquor | 0.5 |
| Magnesium sulfate heptahydrate | 0.025 |
| Potassium dihydrogen phosphate | 0.1 |
| Dipotassium hydrogen phosphate | 0.05 |
| Calcium chloride dihydrate | 0.01 |
| Trace mineral solution[1] | 0.625 |
| Water to volume | |

[1] footnote 3, supra

The pH of the vegetative medium was adjusted to pH 6.5 prior to autoclaving. The inoculated vegetative medium was incubated at a temperature of 26° C. on a 250 rpm. rotary shaker having a 2 inch stroke for 48 hours.

The incubated vegetative medium was then employed as the inoculum for the fermentation medium at a ratio of 1 percent vegetative medium per volume of fermentation medium. The sterile production medium employed had the following composition:

| Ingredient | Percent (weight/volume) |
|---|---|
| Sucrose | 4 |
| Glycerol | 1 |
| Sodium glutamate | 0.5 |
| Peanut meal | 2 |
| Ferrous ammonium sulfate hexahydrate | 0.3 |
| Potassium nitrate | 2.0 |
| Calcium carbonate | 0.3 |
| Water to volume | |

The use of a surface active agent or defoaming agent is optionally employed in carrying out the large scale fermentation. The pH of the fermentation medium was adjusted to pH 6.5 before sterilization. The inoculated fermentation medium was then incubated with agitation at a temperature of 26° C. for 5 days. During the fermentation, sterile air was passed through the fermentation medium at a rate corresponding to about ½ volume of air per volume of culture medium per minute. The terminal pH of the fermentation medium was pH 7.5.

Fifteen liters of the whole broth produced as described above were acidified to pH 2 with sulfuric acid. The acidified whole broth was stirred for 1 hour at room temperature, and thereafter the pH was adjusted to pH 6.0 with sodim hydroxide solution. The broth was filtered and the aqueous filtrate was extracted with n-butanol to remove insolubles in suspension. The aqueous phase was then passed through a column packed with activated carbon, and the colunn was washed with distilled water. The eluate from the water wash was discarded. The column was then eluted with 50 percent aqueous acetone. The eluate was evaporated in vacuo to the aqueous phase which was then chromatographed over a column packed with Amberlite IRA 68 quarternary ammonium polystyrene resin in the acetate cycle. The column was at first washed with water, and the water wash was discarded. The active fermentation products were then eluted from the column with a 0.15 N aqueous sodium acetate solution. Multiple fractions were collected and those fractions containing deacetoxycephalosporin C were combined.

The presence of deacetoxycephalosporin C in the eluate fractions was determined by bioautographs. The system employed was as follows: the initial chromatography was carried out in the descending manner using untreated Whatman No. 1 chromatography grade paper. The eluting solvent was acetonitrile:water (80 percent:20 percent). The bottom of the chromatography chamber was layered with a solvent mixture containing 300 ml. of a solution containing 37.5 percent n-propanol, 25 percent pyridine, 7.5 percent acetic acid and 30 percent water which was diluted with 100 ml. of acetonitrile. The location of deacetoxycephalosporin C on the chromatograph was determined by running a bioautograph with the developed chromatogram and using the organism *Pseudomonas solanacearum* as the detecting organism.

The fractions obtained which were shown by the above described chromatographic procedure to contain deacetoxycephalosporin C were combined. The combined fractions were then absorbed on a column packed with activated carbon, and the column was initially washed with distilled water to remove soluble inorganics, for example, sodim acetate. Thereafter, the column was eluted with 50 percent aqueous acetone. The eluate was evaporated in vacuo to dryness to yield a crude solid preparation of deacetoxycephalosporin C sodim salt.

The crude material was further purified by chromatography over a column packed with cellulose (Avicel pH 101). The antibiotic was eluted from the cellulose column with a solvent mixture comprising acetonitrile:-water (80:20). Multiple fractions were collected, and, by employing the chromatographic system described above for detection, those fractions which were found to contain deacetoxycephalosporin C were combined. The combined fractions were then concentrated to dryness, and the dry residue containing deacetoxycephalosporin C was dissolved in a minimum amount of isopropanol. The alcohol solution was poured into an amount of ether corresponding to about 20 volumes of the iso-propanol solution. With stirring, the sodium salt of deacetoxycephalosporin C formed as a precipitate. The precipitate was filtered and air dried to provide 126 mg. of the antibiotic as the sodium salt.

EXAMPLE 2

Following the procedures described by Example 1, spores of Emericellopsis sp. NRRL 5714 were cultured through the vegetative medium stage by employing substantially the same vegetative medium. The cultured medium is then used to inoculate a production medium having the following composition:

| Ingredient | Percent (weight/volume) |
|---|---|
| Soluble starch | 1.0 |
| Dextrose | 4.0 |
| Soybean grits | 1.0 |
| Calcium carbonate | 0.5 |
| Antifoam agent | 0.1 |
| Water to volume | |

The pH of the production medium was adjusted to pH 6.5 before autoclaving before inoculation.

The fermentation is run for 5 days at about 26° C. and deacetoxycephalosporin C is isolated by following the recovery and isolation procedures described by Example 1.

EXAMPLE 3

Following the culturing procedures described by Example 1, spores of Scopulariopisis sp. NRRL 5715 were germinated and grown in the vegetative medium described by Example 1. The vegetative medium was used to inoculate a fermentation medium having the composition of the fermentation medium described by Example 1. The fermentation was carried out for 5 days at about 26° C. and deacetoxycephalosporin C was recovered from the fermentation medium by the procedures described by Example 1.

EXAMPLE 4

By employing the media, culture procedures and recovery methods of Example 1, *Paecilomyces carneous* NRRL 5711 was cultured and fermented to produce deacetoxycephalosporin C.

EXAMPLE 5

Following the procedures of culturing and isolation and the media described by Example 1, *Diheterospora chlamydosporia* NRRL 5728 was grown and fermented to produce deacetoxycephalosporin C.

We claim:

1. A method for producing deacetoxycephalosporin C which comprises cultivating in an aqueous nutrient culture medium under submerged aerobic fermentation conditions a penicillin N producing microorganism belonging to the genera Cephalosporium, Emericellopsis, Scopulariopsis, Paecilomyces or Diheterospora until a substantial amount of deacetoxycephalosporin C is produced by said microorganism in said culture medium and isolating deacetoxycephalosporin C from said culture medium.

2. The method of claim 1 wherein the microorganism belongs to the genus Cephalosporium.

3. The method of claim 1 wherein the microorganism belongs to the genus Emericellopsis.

4. The method of claim 1 wherein the microorganism belongs to the genus Scopulariopsis.

5. The method of claim 1 wherein the microorganism belongs to the genus Paecilomyces.

6. The method of claim 1 wherein the microorganism belongs to the genus Diheterospora.

7. The method of claim 2 wherein the microorganism is selected from the group consisting of
Cephalosporium Corda NRRL 5445
*Cephalosporium chrysogenum* ATCC 14615
Cephalosporium sp. NRRL 5712
Cephalosporium sp. NRRL 5716
Cephalosporium sp. NRRL 5718
Cephalosporium sp. NRRL 5719
Cephalosporium sp. NRRL 5720
Cephalosporium sp. NRRL 5721
Cephalosporium sp. NRRL 5722
Cephalosporium sp. NRRL 5723
Cephalosporium sp. NRRL 5724 and
Cephalosporium sp. NRRL 5725.

8. The method of claim 3 wherein the microorganism is selected from the group consisting of
Emericellopsis sp. NRRL 5446
Emericellopsis sp. NRRL 5447
Emericellopsis sp. NRRL 5713
Emericellopsis sp. NRRL 5714 and
Emericellopsis sp. NRRL 5717.

9. The method of claim 4 wherein the microorganism is Scopulariopsis sp. NRRL 5715.

10. The method of claim 5 wherein the microorganism is *Paecilomyces carneus* NRRL 5711.

11. The method of claim 6 wherein the microorganism is *Diheterospora chlamydosporia* NRRL 5728.

* * * * *